(12) United States Patent
Bovo et al.

(10) Patent No.: US 6,915,110 B2
(45) Date of Patent: Jul. 5, 2005

(54) MULTI-PROTOCOL CALL TRACE ON GPRS GB-GR

(75) Inventors: Antonio Bovo, Padua (IT); Alessio Biasutto, Mestre (IT); Andrea Nicchio, Padua (IT)

(73) Assignee: Tektronix International Sales GmbH, Schaffhausen (CH)

( * ) Notice: Subject to any disclaimer, the term of this patent is extended or adjusted under 35 U.S.C. 154(b) by 503 days.

(21) Appl. No.: 10/072,724

(22) Filed: Feb. 5, 2002

(65) Prior Publication Data

US 2003/0148755 A1 Aug. 7, 2003

(51) Int. Cl.[7] .............................................. H04Q 7/20
(52) U.S. Cl. ...................... 455/67.1; 455/423; 455/424; 455/425; 455/456.1; 455/422.1; 455/9; 370/241.1; 370/251; 370/252
(58) Field of Search .............................. 455/67.11, 423, 455/424, 425, 456.1, 9, 422.1; 370/241.1, 251, 252

(56) References Cited

PUBLICATIONS

Hakan Granbohm and Joakim Wiklund, "GPRS—General Packet Radio Service", Ericsson Review No. 2, 1999, pp. 82–88.

Primary Examiner—David Hudspeth
Assistant Examiner—Julio Perez
(74) Attorney, Agent, or Firm—Francis I. Gray

(57) ABSTRACT

A method of multi-protocol call trace on GPRS Gb and Gr interfaces of a GSM network uses distributed processing. Probes are situated at locations where measurements are desired in a monitored mobile network, such as at Gb and Gr interfaces, and are connected in a non-intrusive manner to the mobile network. A remote server is coupled to each probe over a local area network (LAN) to process data as it is acquired by the probe. The probe and remote server are coupled to a central server via a wide area network (WAN), as are client servers. The remote servers manage the probe data (packet data units—PDUs) in real time to create appropriate transactional and raw data indices that are stored locally with the PDUs. Call/procedure trace applications are initiated from the client servers and disseminated by the central server to the remote servers. The remote servers provide results back to the central server which correlates the results and disseminates them back to the remote servers to obtain additional results for correlation. The results from the central server are provided to the client servers which display or visualize the results.

2 Claims, 3 Drawing Sheets

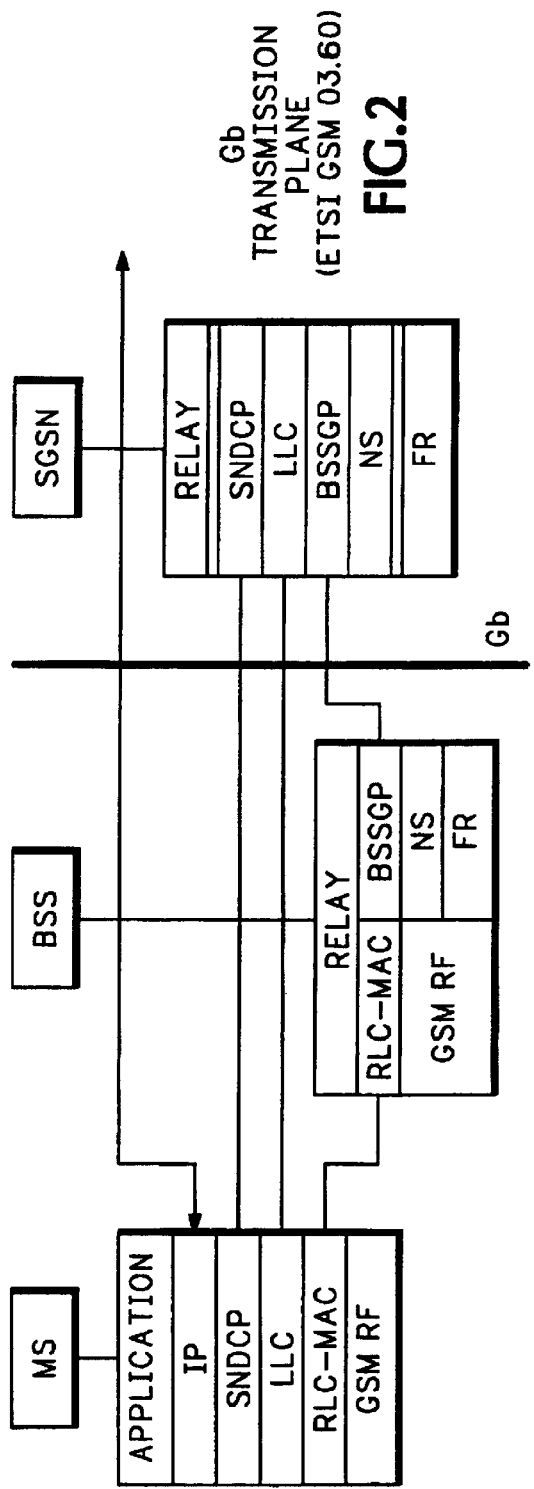
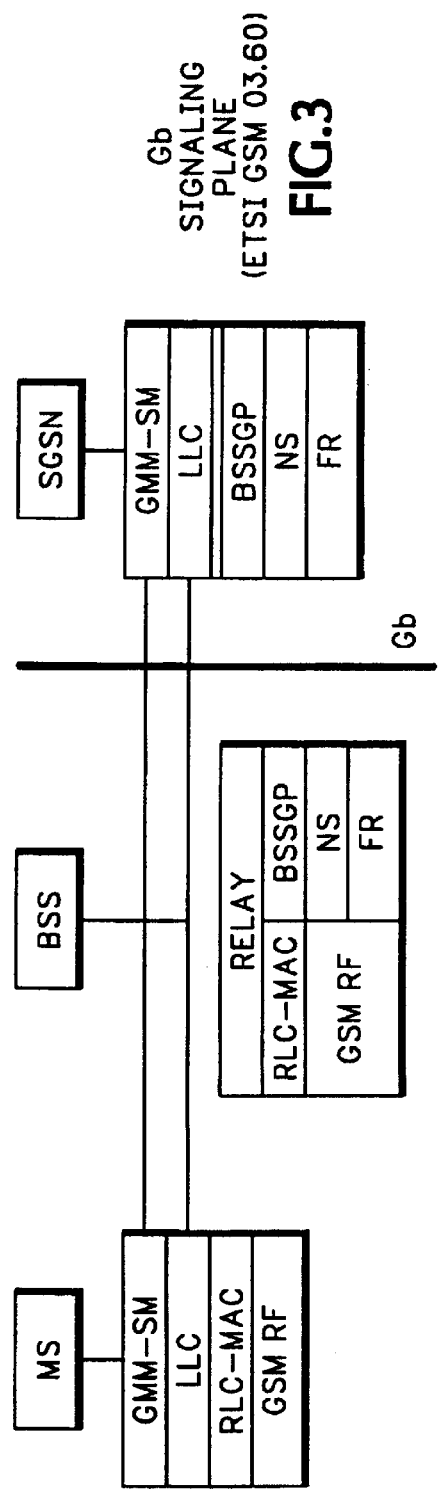

MULTI-PROTOCOL CALL TRACE ON GPRS GB-GR

BACKGROUND OF THE INVENTION

The present invention relates to monitoring a mobile network, and more particularly to a method of performing a multi-protocol call trace on General Packet Radio Service (GPRS) Gb-Gr interfaces of a Global System for Mobile communications (GSM) network.

GPRS is a standard from the European Telecommunications Standards Institute (ETSI) on packet data on mobile communications networks. By adding GPRS functionality to the Public Land Mobile Network (PLMN) operators give their subscribers access to external Internet Protocol-based (IP) networks. GPRS introduces two new nodes for handling packet traffic, as shown in FIG. 1: a serving GPRS support node (SGSN) and a gateway GPRS support node (GGSN). These nodes interface with a home location register (HLR), a mobile switching center/visitor location register (MSC/VLR) and base station subsystems (BSS). The GGSN is coupled to the SGSN via an IP backbone, and the SGSN is coupled to the BSS and resides at the same hierarchical level in the network as the MSC/VLR. The SGSN keeps track of the location of the GPRS user, performs security functions and handles access control, i.e., it does for the packet data service (PDS) what the MSC/VLR does for the circuit switched service (CSS). A Gb interface regards the communication between the BSS and the SGSN, while a Gr interface regards the communication between the HLR and the SGSN.

As an example the Gb interface carries both signaling and payload messages. The signaling is related to the "signaling plane" and the payload is related to the "user plane." The layout of the user plane is shown in FIG. 2 and the layout of the signaling plane is shown in FIG. 3. The protocols to be evaluated are the frame relay (FR), network service (NS), base station system GPRS protocol (BSSGP), the logical link control (LLC) and the GPRS mobility management and session management (GMM/SM).

Generally the requirements for call trace include tracing GPRS procedures on the Gb and Gr GPRS interfaces, with both real time and off-line GPRS procedure trace needed. The procedure trace on GPRS is applied network wide on all the GPRS Gb logical links and Gr signaling links available in the system. The user may view together the Gb and Gr results, if monitoring of these interfaces is available.

In GPRS networks, as well as the previous GSM networks, there is a deep interaction between different network entities throughout the network. Basic features, such as packet switched mode and increased transfer speed, mobility, roaming radio resource sharing, etc., have to be controlled and measured to assure a good quality of service (QOS) to subscribers. One main problem that network operators have to solve is the control of the network and the ability to check specific problems in each network interface as well as network wide. For example the subscriber may complain: "Yesterday I wasn't able to get the GPRS service working" or "One hour ago my GPRS file transfer had a terribly slow transfer rate." The operator has to provide a reason why the service wasn't available and check the problem in the network, taking into account all the network entities that may be significant in the process, such as the cell, the BSS, the SGSN, the HLR, etc. To accomplish this the operator needs to store the GPRS Gb and Gr data of the network for a period of time, to analyze the stored GPRS data in a fast, easy way to get information about subscriber activity, to correlate Gb and Gr transactions as well as GPRS and GSM transactions and calls network wide, to analyze the GPRS Gb and Gr traffic in real time, and to display the results with different levels of detail.

The straight forward way to have a multi-protocol procedure or call trace on GPRS is to store every packet data unit (PDU) from probes located at monitoring points in a centralized system and on demand from a user-client get the stored PDUs and decode and process them according to a trigger. The multi-protocol correlation may be done with more post-processing elaboration on the results of the previous process. However this is not a fast, easy way to get the results of the procedure trace for the user. The problems of this approach are the bandwidth needed to get everything in a centralized repository and the extremely slow decoding process on huge amounts of PDUs. With this approach the results of a procedure trace applied on one day of GPRS data may be available after one day of processing.

What is desired is a fast, easy way to perform procedure trace on GPRS data without involving a lot of bandwidth while allowing correlation of GPRS and GSM results.

BRIEF SUMMARY OF THE INVENTION

Accordingly the present invention provides a method of multi-protocol call trace on GPRS Gb and Gr interfaces of a GSM network using distributed processing. Probes are situated at locations where measurements are desired in a monitored mobile network, such as at Gb and Gr interfaces, and are connected in a non-intrusive manner to the mobile network. A remote server is coupled to each probe over a local area network (LAN) to process data as it is acquired by the probe. The probe and remote server are coupled to a central server via a wide area network (WAN), as are client servers. The remote servers manage the probe data (packet data units—PDUs) in real time to create appropriate transactional and raw data indexes that are stored locally with the PDUs. Call/procedure trace applications are initiated from the client servers and disseminated by the central server to the remote servers. The remote servers provide results back to the central server which correlates the results and disseminates them back to the remote servers to obtain additional results for correlation. The results from the central server are provided to the client servers which display or visualize the results.

The objects, advantages and novel features of the present invention are apparent from the following detailed description when read in conjunction with the appended claims and attached drawing.

BRIEF DESCRIPTION OF THE SEVERAL VIEWS OF THE DRAWING

FIG. 2 is a layout view of a GPRS transmission plane.

FIG. 3 is a layout view of a GPRS signaling plane.

DETAILED DESCRIPTION OF THE INVENTION

Figure 1:
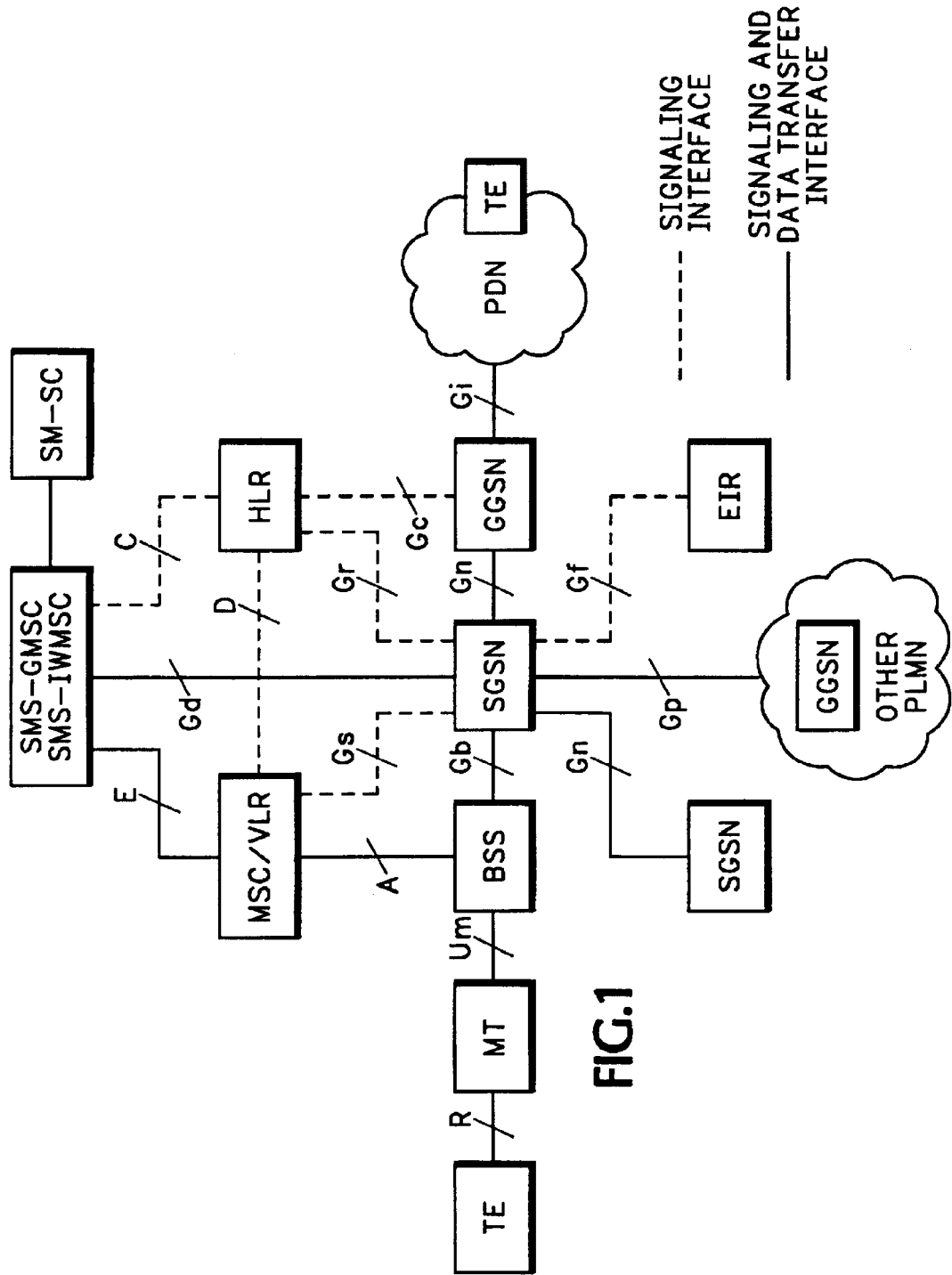
FIG. 1 is a generalized block diagram view of a GPRS network.
Figure 4:
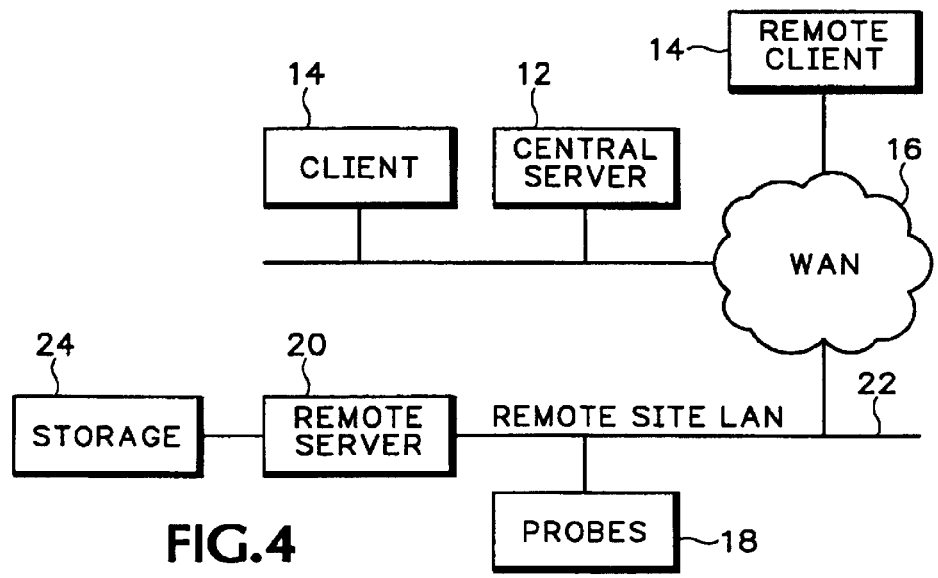
FIG. 4 is a generalized block diagram view of a system for multi-protocol call trace according to the present invention.

Referring now to FIG. 4 a network monitoring system is shown having a central server 12 that manages the system.

Server clients 14 may be co-located with the central server or remotely connected via a wide area network (WAN) 16. Probes 18 are situated at locations where measurements are desired, such as switches in the network being monitored, and are connected to the monitored network in a non-intrusive manner. A remote server 20 is connected via a local area network (LAN) 22 to the probes and is located at the measurement location. The remote server 20 and probes 18 are coupled to the central server 12 via the WAN 16. A storage device 24, such as disk arrays, is coupled to the remote server 20 for storing raw PDU data and also is co-located with the probes 18.

The probes 18 are connected to the monitored network to collect all the PDUs and store them in the local storage device 24. The remote server 20 manages the PDUs in real time to create appropriate indexing for them and provides a call/trace application on demand. The central server 12 collects the results from the remote server(s) 20 and aggregates them, and also communicates correlation triggers to the remote server(s). The clients 14 visualize or display the results, providing the graphic utilities to analyze them better including multi-windowing, arrow diagrams, text messages, etc.

Given a scenario where it is desired to manage a multi-protocol call/procedure trace on GPRS Gb and Gr interfaces and GSM interfaces as well and where the system user needs five days of past data to be analyzed, the number of GPRS time slots per site being more or less than one hundred, if the user needs to trace a subscriber, then hundreds of gigabytes of data have to be processed to look for the specific calls or procedures. Also the results have to be correlated to look for calls/procedures' elements monitored at different sites and managed by different parts of the system. To solve this problem entails providing an extensive use of indexes, as detailed as possible, to make search activities easier; having a distributed approach in which each site processes its own data; and allowing correlation in an efficient way, sharing all needed information.

As an example, suppose a GPRS/GSM subscriber is going to attach to the mobile network and start WEB browsing, and during this activity the subscriber receives a call from another subscriber so that an incoming GSM mobile call is appearing during the GPRS activity. The telecom network operator needs to trace the subscriber activity based only on its mobile station ISDN (MSISDN) telephone number as the user trigger. Monitoring the Gr interface provides the correlation between the MSISDN and the international mobile subscriber identity (IMSI). This correlation is monitored following the incoming and outgoing messages pertaining to the "update location" and "insert subscriber data" messages transferred between the SGSN and the HLR. After this the IMSI is used to get all the GPRS GMM/SM messages in the Gb interface, correlating this information with the dynamic temporal logical link identifier (TLLI) addressing used typically in this interface.

In a similar manner the IMSI is used to correlate the incoming GSM call, because the BSSAP A-interface provides the PAGING message with IMSI/TMSI data that may be used to identify properly the incoming call. So at the end:

MSISDN→IMSI correlation from Gr

IMSI→TLLI correlation from Gb

IMSI→TMSI correlation from GSM BSSAP

These are three separate correlations needed to properly monitor all the subscriber activities in this scenario.

This NET-GPRS system, as opposed to a prior NET-7 system, manages both the Gb and Gr signaling; correlates the Gb uplink and downlink information on the remote servers 20 rather than the probes 18 so that the probes don't have to exchange information real time but only monitor the signaling they see; manages dynamic addressing using TLLI information, typical of Gb signaling; and manages the TLLI/IMSI correspondence also outside the period of analysis that is typically needed for Gb signaling.

More level index structures are used which are compiled by the probes 18 in real time and transferred to the local storage 24 of the co-located remote server 20. These structures have two levels: a transactional level and a raw data index level. The remote server 20 is used to perform the search activities on user demand—a call/procedure trace session. In the remote server 20 an appropriate database program is used to reach better performances during the search activities. The correlation of the results is distributed between the remote server 20 and the central server 12 to allow multi-protocol correlation between GPRS Gb and Gr and between GSM and GPRS.

In detail the probes 18 store all the packet data units/message signal units (PDU/MSUs) in the raw data repository, i.e., the local storage 24. The probes 18 decode the PDU/MSU. The probes 18 identify if a PDU belongs to a Gr transaction or to specific Gb procedures. For each Gr transaction and for each Gb GMM/SM PDU, the probes 18 compile an index record, named for this purpose a transactional detail record* (TDR*). The TDR* has all the necessary subscriber information monitored by the PDU (IMSI, MSISDN number, etc.), and all the necessary information to identify all the PDU/MSUs related to this transaction (temporal logical link identifier—TLLI, routing area code/location area code—RAC/LAC, and international mobile subscriber identity—IMSI—to identify the PDU related to a Gb procedure or the originating and destination identifiers, calling and called node identifiers for a Gr transaction). This information is denoted as parameters of signaling (PARSIGN). The TDR*s are transferred real time by the probes 18 to the local storage 24. The probes 18 also compile another index structure, a "raw index file", inserting among other parameters the PARSIGN. The raw index file also is transferred by the probes 18 to the local storage 24.

The remote server 20 imports the TDR*s transferred by the probes 18 in an appropriate database structure with multi-indexing. The indexes are basically all triggers that may be used during search activities. When a call/procedure trace session is activated, the first phase is for the remote server 20 to look for the triggers in the database structure, such as the MSISDN, called or calling both, or the IMSI. Then the remote server 20 looks for correlated TDR*s, starting from those found in the search. The TDR*s are used in "correlation algorithms" to look for specific scenarios.

An example of a correlation algorithm for the Gb-Gr follows:

From the user trigger MSISDN the Gr transaction of a certain IMSI is found. Then the IMSI of the Gr interface is compared with those of the Gb interface—Gb_IMSI=Gr_IMSI. This condition is applicable if the time of the two transactions differs less than a certain delta—abs(Gr_TSStart−Gb_TSStart)<=DELTA_GBGR or abs(Gb_TSStart−Gr_TSEnd)<=DELTA_GBGR.

For Gb-Gb correlation:

$$Gb1\_IMSI = Gb2\_IMSI \text{ or } Gb1\_TLLI$$

All the TLLI reallocations are taken into account in the algorithm.

All the TDR*s found are collected and sent to the central server 12 which aggregates them, removing duplicated ones, and re-sends them to all the other remote servers 20. This is the mechanism for distributing the dynamic triggers to the remote servers 20.

In the second phase the search is re-done at the remote server 20 with the TDR*s found by the other remote servers to allow correlation between more measurement sites. This dynamic correlation may be iterated until no more new TDR*s are found. In each phase the correlation algorithms are used to get more TDR*s and to merge the TDR*s belonging to the same scenario.

The last phase begins with all the found TDR*s. Each remote server 20 gets all the PARSIGN information and with these keywords looks for the PDU/MSUs in the raw index files. Also time constraints coming from the TDR*s are used to look for less information in the raw index files. The resulting PDU/MSUs are sent to the central server 12. The central server 12 processes these data, sorts them and inserts also text comments between them, if needed, to make the comprehension of the data flow easier—"the start of a GPRS connection" message is inserted before an attach request PDU.

The results may be viewed in the clients 14 with different levels of detail: a synthetic window with only the synthetic view of the PDU/MSUs and the text messages; a complete detailed window with all the details about each PDU/MSU; a message window with the explanation in detail of each text message; a correlation window with all the information about the correlation process; a hexadecimal window for the hex view of the PDU/MSUs; or an arrow diagram providing a graphic representation of the data flow and text explanation.

Figure 5:
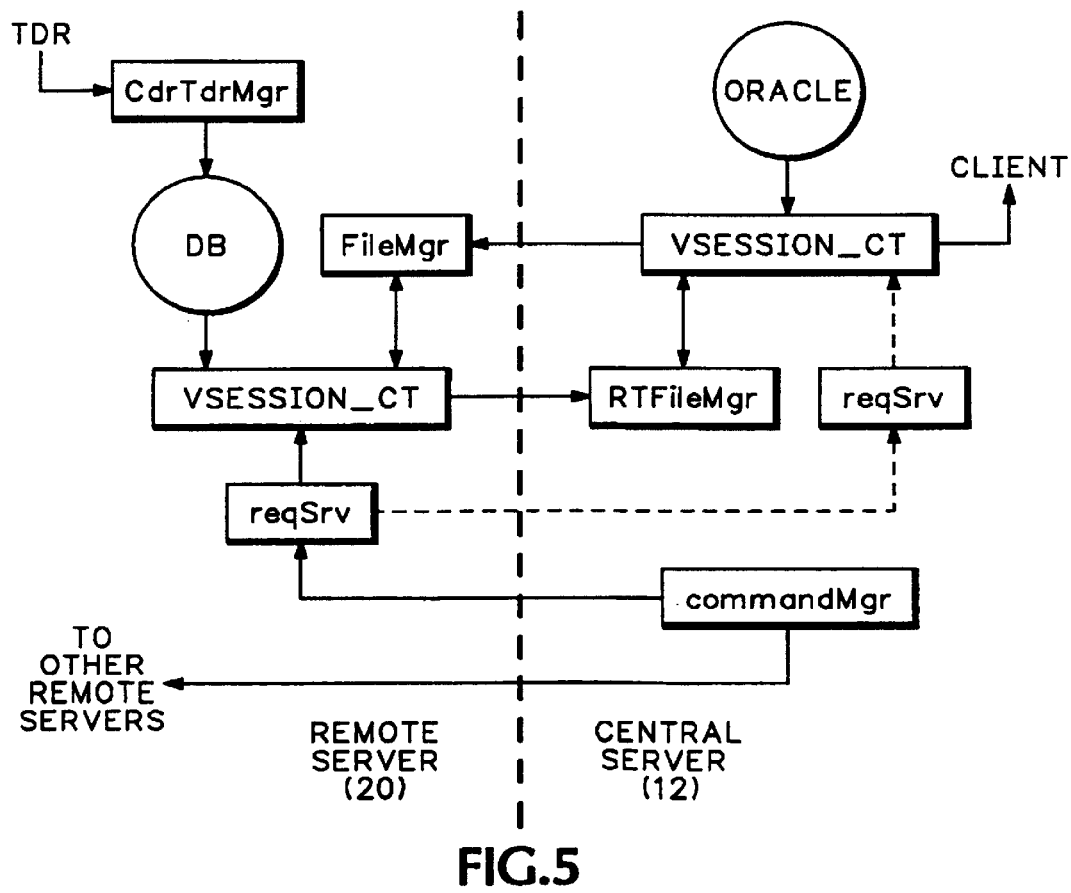
FIG. 5 is a software architecture block diagram view of a system for multi-protocol call trace according to the present invention.

The layout of the software architecture is shown in FIG. 5. The TDR*s are input to a CdrTdrMgr module at the remote server 20 which processes them to import them into the database format for storage in the database 24. A Vsession_CT module in both the remote and central servers 20, 12 is the core module for the call/procedure trace. The results from these modules are input to respective file manager modules in the opposing server. Also the output from the Vsession_CT module in the central server is distributed to a client 14 for viewing of the results. Also the RTFileMgr in the central server 12 polls the results of the different phases from the remote server 20. Respective reqSrv modules manage all other processes and start a new session. Finally a commandMgr module manages user commands from the client 14.

Thus the present invention provides a fast, easy multi-protocol call/procedure trace on the GPRS Gb and Gr interfaces of a GPRS/GSM network by having a remote server at each monitoring site processing locally acquired PDU/MSUs on demand, using extensively the synthetic information provided real time by the probes (TDR*) and indexing this information appropriately with dynamic correlation of this information in a distributed architecture, managed with a remote server—central server handshaking of resulting information iteratively, so that the call/procedure trace application manages huge amounts of data while providing fast responses, minimizing bandwidth requirements and optimizing system resources.

What is claimed is:

1. A method of performing a multi-protocol call/procedure trace on GPRS Gb and Gr interfaces of a GPRS/GSM system comprising the steps of:

acquiring PDU/MSU data from the GPRS Gb and Gr interfaces at a measurement location;

indexing in real time the acquired PDU/MSU data at a transactional level and at a raw data level;

storing the indexes and the acquired PDU/MSU data in a storage device at the measurement location;

on demand processing by a remote server at the measurement site a search request, correlating all related data from the storage device using the indexes;

providing the results from the search request to a central server;

disseminating the results by the central server to remote servers at all measurement sites of the GPRS/GSM system;

repeating the processing by the remote server using dynamic triggers from the previous steps to correlate all related data from all measurement sites;

providing the final results to the central server; and aggregating the final results and providing them to a client for display processing.

2. A system for monitoring a mobile communications network comprising:

a probe coupled to a point in the mobile communications network for acquiring data from the mobile communications network;

a remote server coupled locally to the probe for indexing the acquired data at a transactional and a raw data level;

disk arrays coupled to the remote server for storing data and indexes;

a central server remotely coupled to the probe and remote server for communicating with the remote servers and, for a call procedure trace, collecting and correlating data from the remote servers to produce results requested by the call procedure trace; and a client server coupled to the central server for communicating the call procedure trace to the central server and displaying the results from the central server.

* * * * *